United States Patent [19]
Zerrer

[11] Patent Number: 5,887,489
[45] Date of Patent: Mar. 30, 1999

[54] LOCKING DEVICE FOR A ROTARY MEMBER OF A WORKING TOOL

[75] Inventor: Gerhard Zerrer, Korb, Germany

[73] Assignee: Andreas Stihl AG & Co., Waiblingen, Germany

[21] Appl. No.: 937,978

[22] Filed: Sep. 26, 1997

[30]    Foreign Application Priority Data

Sep. 27, 1996 [DE] Germany ................. 296 16 862 U

[51] Int. Cl.[6] ................................................. G05G 5/06
[52] U.S. Cl. ...................... 74/527; 188/69; 192/69.62
[58] Field of Search .................... 74/527, 411.5; 188/69, 31, 60, 82.74; 192/69.62, 69.71

[56]    References Cited

U.S. PATENT DOCUMENTS 4,037,488   7/1977   Laney, Sr. ............................. 74/527 X
4,690,252   9/1987   Kottke et al. .......................... 188/69
5,704,257   1/1998   Kottke et al. ......................... 74/527 X

*Primary Examiner*—Charles A. Marmor
*Assistant Examiner*—Mary Ann Battista
*Attorney, Agent, or Firm*—Robert W. Becker & Associates

[57]    ABSTRACT

A locking device for a drive shaft of a rotating tool member of a working tool includes a securing element fixedly connected to the drive shaft of the rotating tool member. A locking bolt has a longitudinal axis and is axially moveable between a locking position and a release position. The securing element has at least one catch opening for receiving the locking bolt in the locking position. An actuating element is positioned adjacent to the locking bolt. A spring element has a first end and a second end whereby the first end is connected to the actuating element. The second end projects into the travel path of the locking bolt and engages the locking bolt for moving it into the locking position or into the release position when the actuating element is operated.

19 Claims, 9 Drawing Sheets

Fig. 10
Fig. 11
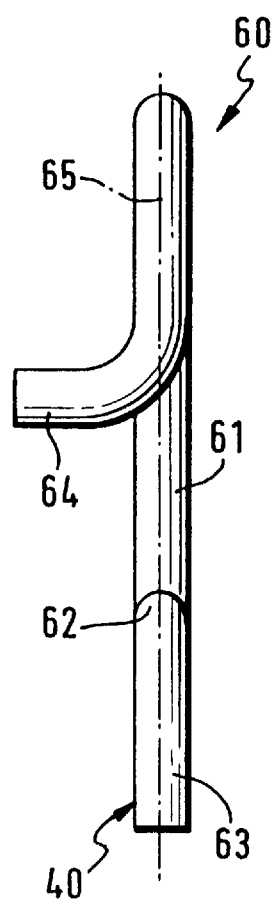
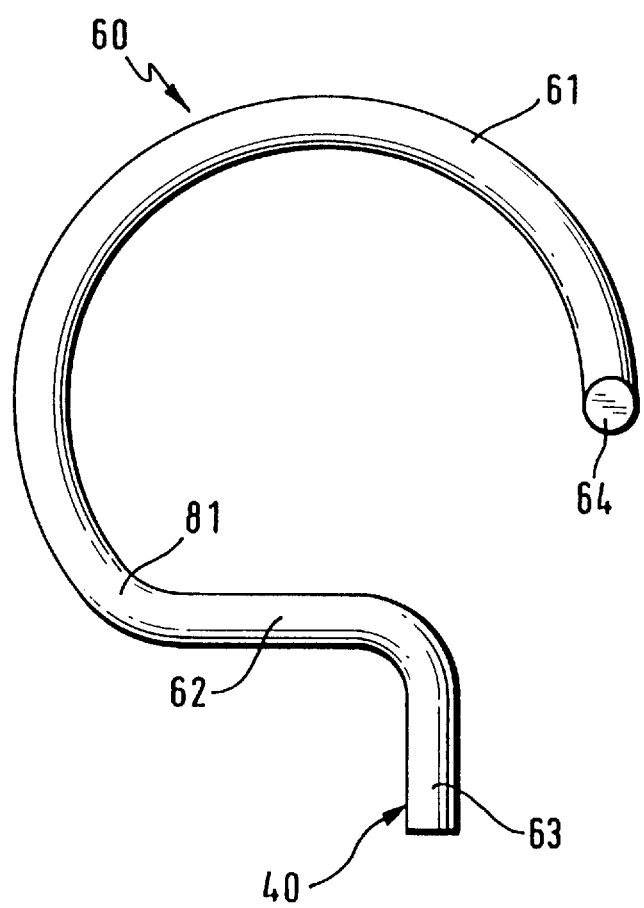

LOCKING DEVICE FOR A ROTARY MEMBER OF A WORKING TOOL

BACKGROUND OF THE INVENTION

The present invention relates to a locking device for the drive shaft of a rotating tool member of a working tool, especially a cutting tool of a trimmer etc., wherein a securing element is fixedly connected to the drive shaft and has a catch opening for a locking bolt. The locking bolt is axially displaceably supported within the housing of the working tool and cooperates with an actuating element that displaces the locking bolt from its locking position within the catch opening into a release position outside of the catch opening. The locking bolt is axially displaceable by a cam which projects into the travel path of the locking bolt and which is actuated by the actuating element.

From German Patent Application 195 42 144 a reliable locking device is known in which the locking bolt is permanently loaded by a spring force in the direction of the locking position at the securing disc. The cam projecting into the travel path of the locking bolt is connected to a turn knob and can release the locking bolt counter to the force of the spring into a release position. The turn knob must be secured in its position in which it holds the locking bolt in the release position to counteract the spring force of the spring acting on the locking bolt is supported and, on the other hand, to compensate acceleration forces resulting from operation of the cutting tool and acting on the locking bolt.

It is therefore an object of the present invention to improve a locking device of the aforementioned kind such that the acceleration forces acting on the locking bolt in its release position can be securely compensated to thereby prevent the accidental actuation of the locking device.

SUMMARY OF THE INVENTION

A locking device for a drive shaft of a rotating tool member of a working tool according to the present invention is primarily characterized by;
- a securing element fixedly connected to a drive shaft of the rotating tool member;
- a locking bolt having a longitudinal axis and axially moveable between a locking position and a release position;
- the securing element having at least one catch opening for receiving the locking bolt in the locking position;
- an actuating element, positioned adjacent to the locking bolt;
- a spring element having a first end and a second end;
- the first end connected to the actuating element;
- the second end projecting into the travel path of the locking bolt and engaging the locking bolt from moving the locking bolt into the locking position or into the release position when the actuating element is operated.

Advantageously, the locking bolt has a receiving element and the second end engages the receiving element.

The receiving element is a transverse bore extending perpendicularly to the longitudinal axis of the locking bolt.

The transverse bore has a diameter that is greater than the diameter of the second end.

The diameter of the transverse bore is at least twice as big as the diameter of the second end.

The spring element is a C-shaped spring bracket.

The spring bracket comprises a curved portion extending in a plane.

The curved portion extends over an angular distance of 180°–270°.

Preferably, the angular distance is 220°.

The second end is preferably positioned in the plane of the curved portion.

Advantageously, the first end extends perpendicularly to the plane of the curved portion.

The second end extends parallel to a diametric line extending through a center of the curved portion.

The spring bracket cooperates radially with a stop member provided at a housing of the working tool.

Advantageously, the spring bracket comprises a straight portion and the second end is located at the straight portion.

The straight portion and the second end extend perpendicularly to one another.

Advantageously, the spring bracket has a transitional portion connecting the straight portion to the curved portion. The transitional portion is supported at the stop member and the stop member is preferably a supporting housing wall of the housing positioned radially outwardly relative to the spring bracket.

The spring bracket is received in an annular receiving chamber of the housing of the working tool.

The actuating element is a turn knob and the spring bracket surrounds a rotational axis of the turn knob.

The turn knob has a guide section and the spring bracket surrounds preferably the guide section.

The spring bracket arranged between the actuating element and the locking bolt provides the required spring force for an automatic insertion of the locking bolt into the catch opening as soon as the turn knob is accordingly positioned. When the locking bolt cannot automatically fall into the catch opening (because bolt and opening are not aligned) even though the turn knob is turned into a position corresponding to the locking position, the spring bracket compensates the stroke difference by elastic deformation so that at the same time the respective spring force is provided for automatically engaging the securing element. Upon rotation of the turn knob, the spring bracket is loaded in a direction of reducing its diameter.

When the turn knob is rotated in the opposite direction for releasing the locking device, the locking bolt is lifted out of the catch opening by the spring bracket and is moved against an abutment provided at the housing of the working tool. As soon as the locking bolt rests securely at the housing, the remaining turn movement of the turn knob (actuating element) in a direction of the release position widens the spring bracket so that the locking bolt is secured by spring force at the abutment.

When a great acceleration force acts on to the locking bolt in the direction of its locking position at the securing element, a further widening of the spring bracket results and thus an increased force for securing the locking bolt in its released position. In a further embodiment of the invention it is suggested to provide a radially outer supporting housing wall correlated with a certain section of the spring bracket. The spring bracket is supported at the housing wall when further widening of the spring bracket occurs. This measure allows safely support or compensate acceleration forces of up to 60 G.

BRIEF DESCRIPTION OF THE DRAWINGS

The object and advantages of the present invention will appear more clearly from the following specification in conjunction with the accompanying, in which:

FIG. 10 is a side view of the spring bracket;

FIG. 11 is a plan view of the spring bracket according FIG. 10;

DESCRIPTION OF PREFERRED EMBODIMENTS

The present will know be described in detail with the aid of several specific embodiments utilizing FIGS. 1–15.

The inventive locking device for the drive of a rotating tool member of a working tool will be explained with the aid of an exemplary embodiment of a cutter head of a trimmer.

Figure 1:
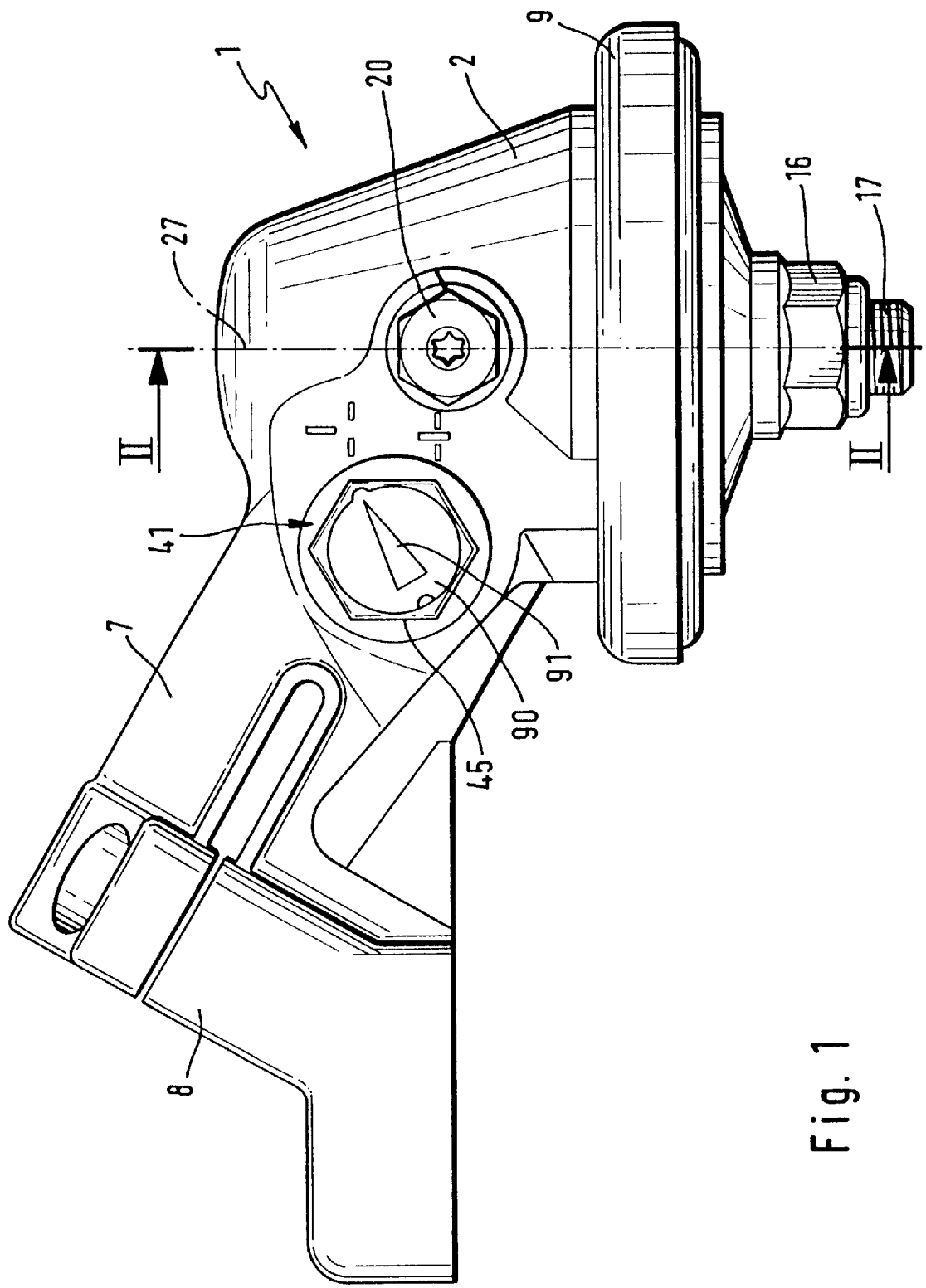
FIG. 1 is a side view of a cutter head of a trimmer with a locking device.
Figure 2:
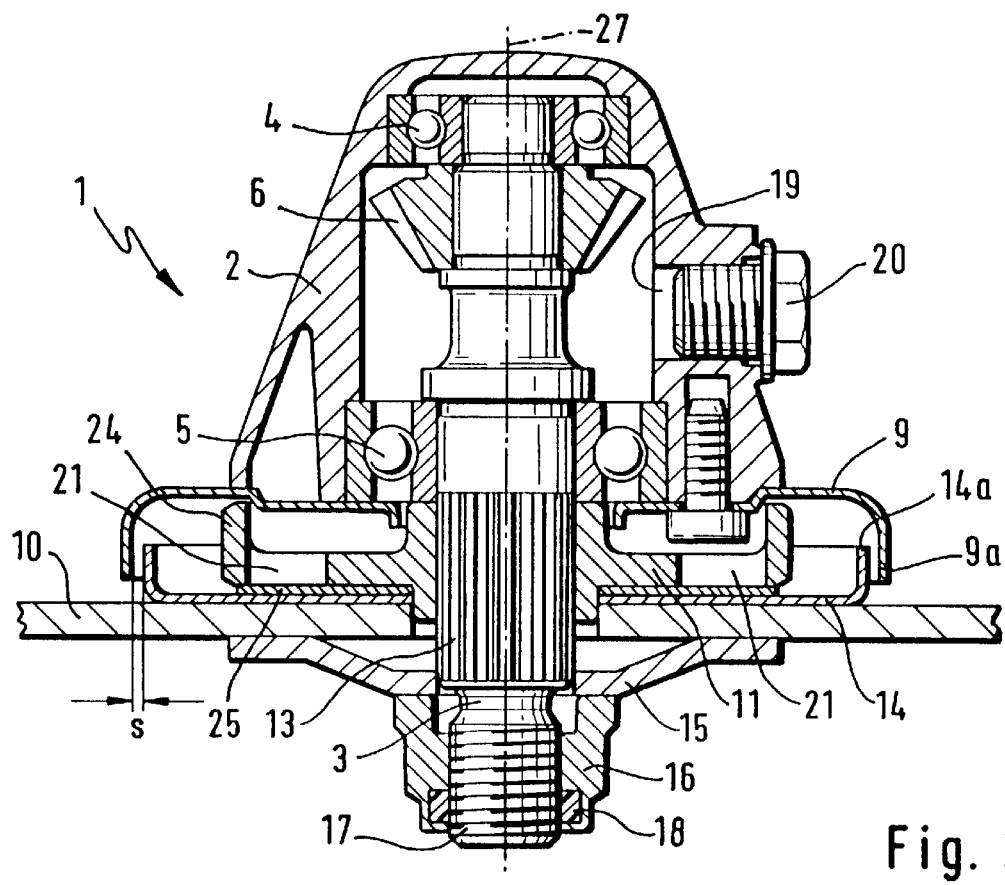
FIG. 2 is a section along line II—II of FIG. 1.
Figure 3:
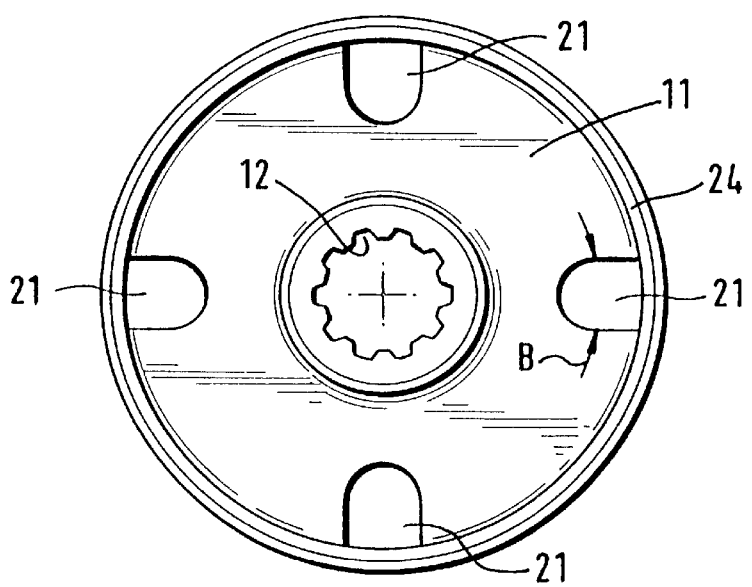
FIG. 3 is a plan view of a securing disc that is fixedly connected to the drive shaft of the cutter head.

The cutter head 1 (FIGS. 1–4) shows a housing 2, in which a drive shaft 3 is arranged and supported by two roller bearings 4 and 5. In the area between the two roller bearings 4 and 5 a bevel gear is arranged on the drive shaft 3 which measures with a non represented drive bevel gear. This drive bevel gear is driven by a shaft positioned within a guide tube whereby the guide tube projects into the connector 7 (FIGS. 1,4) and is fixedly secured by a clamping sleeve 8 fixedly at the housing 2 of the cutter head 1. The housing 2 is closed by a hood-like protective ring 9 at the side facing the tool member 10 (FIG. 2) that encloses a securing element in the form of a securing disc which is fixedly connected to the drive shaft 3. As shown in FIG. 3, the securing disc 11 is provided at its inner circumference with a splined toothing 12 that meshes in a form-locking manner with a corresponding splined toothing 13 of the drive shaft 3. The protective ring 9 enclosing the securing disc 11 is closed by a protective disc 14 whereby the edge 14a of the protective disc 14 and the edge 9a of the protective ring 9 overlap one another in the axial direction, with the edge 14a being radially inwardly positioned relative to the edge 9a. The radial gap S between the edge 9a and the edge 14a ensures the free rotation of the protective disc 14 relative to the protective hood 9 secured at the housing.

The protective disc 14 rests on a working tool 10, for example, a cutting blade, which is axially clamped onto the pressure disc 15 by a clamping nut 16. The working tool 10 is thus fixedly connected to the drive shaft 3. The clamping nut 16 is threaded onto the thread 17 at the free end of the drive shaft 3. A plastic ring 18 is inserted into the clamping nut 16 as a securing element to prevent loosening or loss of the clamping nut 16.

Between the two roller bearings 4 and 5 a lubricant opening 19 opens into the housing 2 and is closed off by a closure screw 20.

Within the securing disc 11 catch openings are provided for engagement by the locking section 22 (FIG. 4) of a locking bolt 23. These catch openings 21 are diametrically oppositely arranged. In the shown embodiment four such catch openings 21 are provided at the securing disc 11 (see FIG. 3).

The securing disc 11 has a rim portion 24 that extends axially relative to the housing extends axially and projects substantially without play to the protective ring 9. At the side facing away from the housing 2, a protective plate 25 is provided between the protective disc 14 and the securing disc 11. This protective disc 25 protects the catch openings 21 against soiling.

Figure 4:
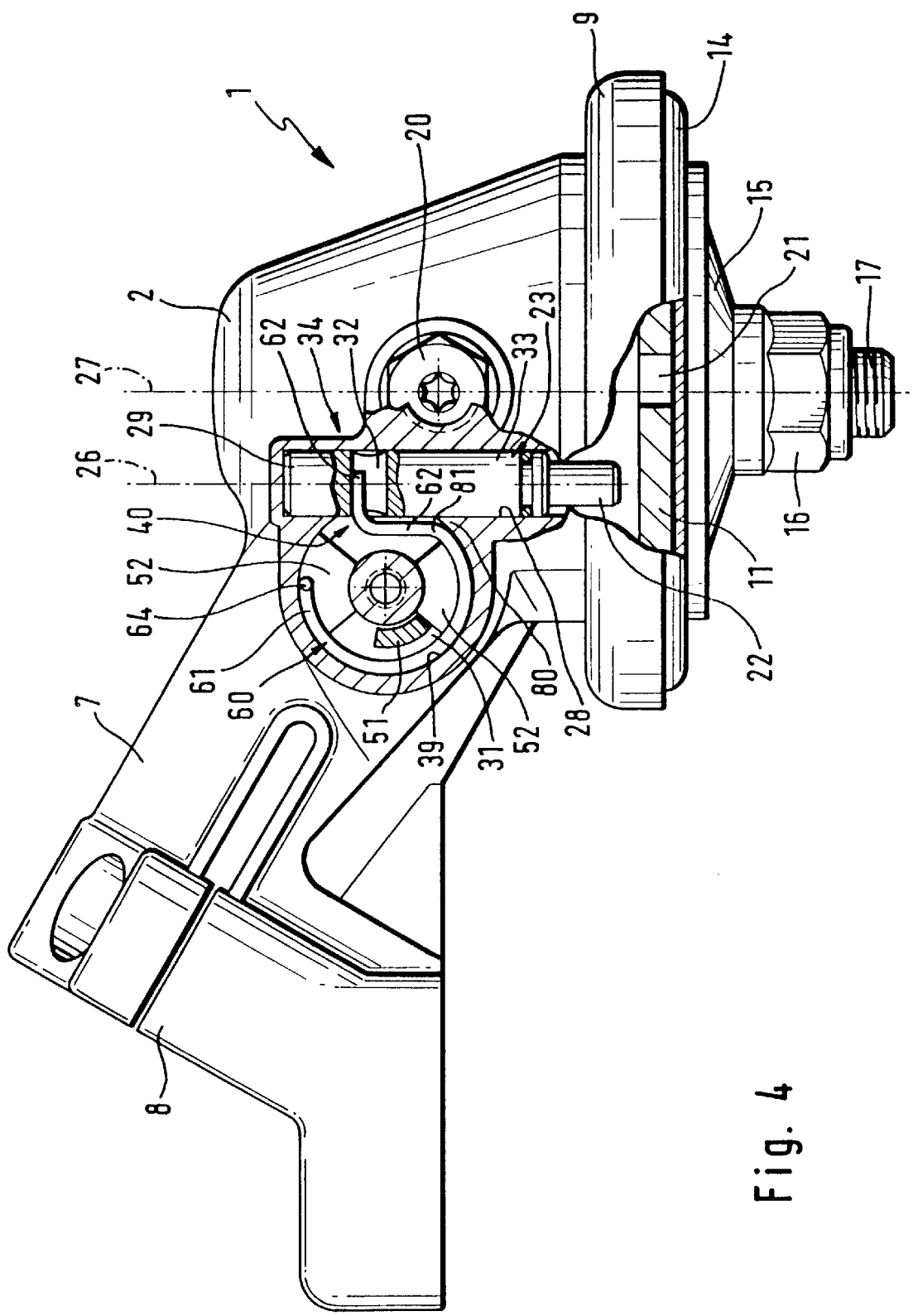
FIG. 4 is a part-sectional view of the cutter head of FIG. 1.

The locking bolt 23 in the shown embodiment is approximately perpendicular to the securing disc 11 (FIG. 4). The longitudinal axis 26 of the locking bolt 23 extends parallel to the axis of rotation 27 of the drive shaft 3. The locking bolt 23 is axially displaceably supported in a housing bore 28 whereby the housing bore 28 is preferably embodied as a blind bore.

The end of the locking bolt 23 facing away from the end face 29 provides a locking section 22 which is embodied so as to engage the catch opening 21 of the securing disc 11. Preferably, the diameter of the locking section 22 is smaller than the base body 33 of the locking bolt 23. Preferably the diameter of the locking section 22 is somewhat smaller than the width B of the catch opening 21 (FIG. 3) in the circumferencial direction.

Figure 5:
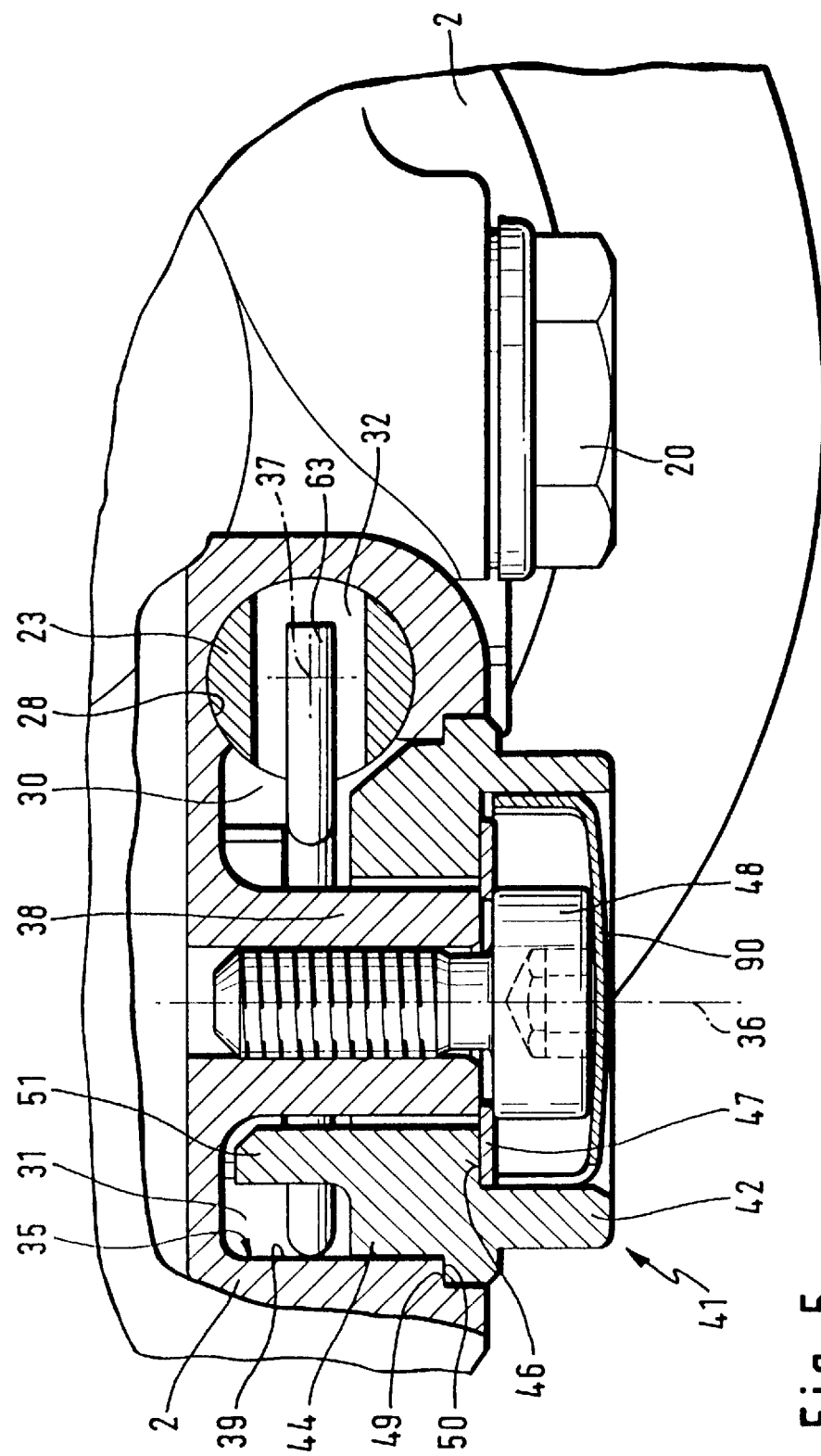
FIG. 5 is a transverse section of the actuating element of the locking device.

Between the locking section 22 and the inner end 29 of the locking bolt 23 a cutout is provided at the base body 33, especially in the form of a transverse bore 32 thus providing an actuating section 34 at the locking bolt 23. A cam 40 of the turn knob (actuating element) 41 engages his cutout or transverse bore 32. The cam 40, as is shown in FIGS. 4 and 5, is received in a cylindrical housing receiving opening 35. The axis 36 of the cylindrical housing receiving opening 35 extends transversely, especially at a right angle, to the axis 37 of the blind bore 28. The cylindrical housing receiving opening 35 intercepts the blind bore 28 in the area of the actuating section 34, i.e., the transverse bore 32 of the locking bolt 23. The receiving opening 35 and the housing bore 28 are thus in communication with one another via window 30.

Figure 6:
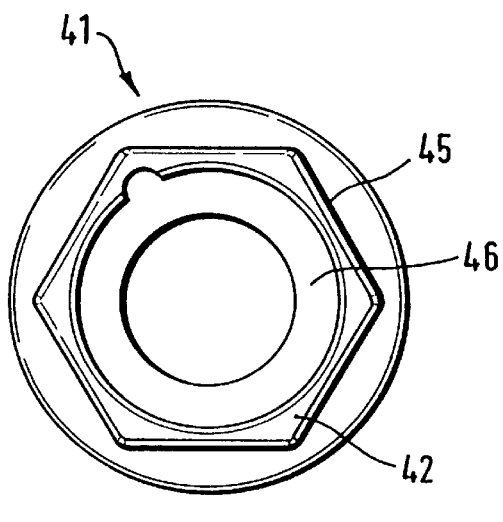
FIG. 6 is a view of the actuating element in the form of a turn knob.
Figure 7:
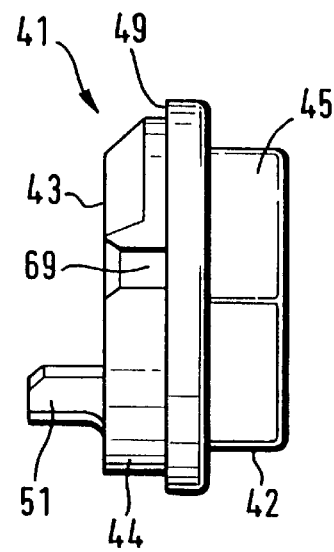
FIG. 7 is a side view of the turn know of FIG. 6.
Figure 8:
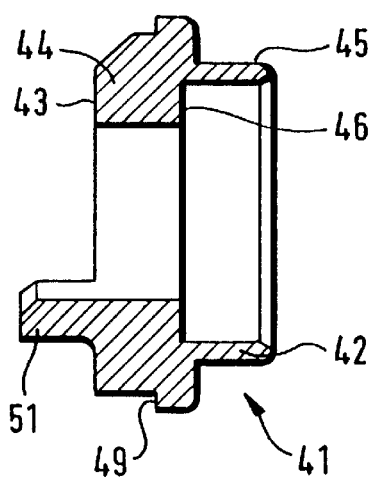
FIG. 8 is an axial section of the turn knob of FIG. 6.
Figure 9:
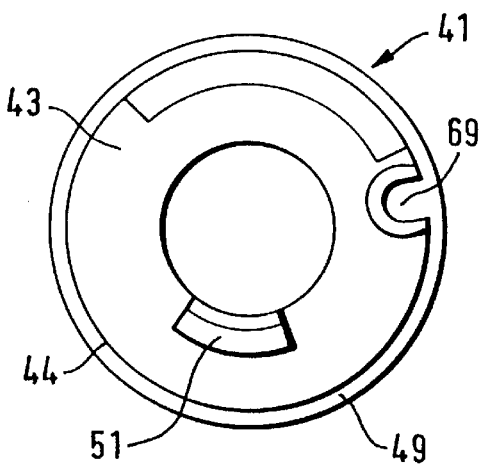
FIG. 9 is a view on to the turn knob of FIG. 6 form below.

The turn knob 41, i.e., the actuating element, comprises a guide section 44 which is positioned within the cylindrical housing receiving opening 35 and secured in the area of the open end of the receiving opening 35 in a form-fitting manner. Adjacent to the guide section 44 a head portion 42 is provided external the housing 2 which, as shown in FIG. 6, is embodied as a nut 45. The size of the nut 45 and the size of the clamping nut 16 are preferably identical.

The turn knob 41 is a hollow cylinder (FIGS. 5–9) whereby the inner diameter of the head 42 is greater than the inner diameter of the guide section 44. The thus provided inner annular shoulder 46 serves as an abutment for the circumferencial edges of a spring plate 47 which is preferably axially secured by a screw 48 on the annular shoulder 46. The screw 48 is threaded into a fastening projection 38 at the housing which is centrally arranged within the housing receiving opening 35 and projects into the guide section 44 of the turn knob 41. Due to the axial spring force resulting upon fastening of the spring plate 47, an outer annular flange 49 of the head 42 is axially forced against the annular surface 50 of the housing 2. Between the annular flange 49 and the annular surface 50 a frictional connection results which prevents rotation of the turn knob 41. The frictional connection of the annular flange 49 at the annular surface 50 of the housing ensures also that the cylindrical housing receiving opening 35 is protected or sealed against soiling.

The rotational movement of the turn knob 41 is limited by a stop 51, which is positioned axially adjacent to the guide section 44 and positioned between the two counter abutment 52 at the housing (see FIGS. 4 and 5).

As can be seen in FIG. 4, between the fastening projection 38 and the cylindrical inner wall 39 of the housing receiving opening 35 an annular chamber 31 (FIG. 5) is formed which is axially closed by the guide section 44 of the turn knob 41. A C-shaped spring bracket 60 (FIG. 11) is positioned with radial play in the annular chamber 31. The spring bracket 60 is comprised of a curved portion extending substantially in a plane and extending about an angular distance (circumferencial angle) of 180°–270°. In the shown embodiment the curved portion has a circumferential angle of approximately 220°. The spring wire has cylindrical circular diameter. However, other cross-sectional shapes may also be expedient. The curved portion 61 at one end thereof has a straight extension 62. Its free end is bent at a right angle outwardly and provides the cam 40 for cooperating with and activating the locking bolt 23. The other end 64 of the spring bracket 60 extends at a right angle to the plane 65, as shown in FIG. 10, and thus positioned perpendicularly to the plane 65.

The end face 43 of the guide section 44 of the turn knob 41 facing the receiving chamber 35 is provided with an insertion opening 69 for the first end 64 of the spring bracket 61. The second end 63, i.e., the cam 40, penetrates the window 30 that connects the housing receiving opening 35 and the housing bore 28 and engages the transverse bore 32 of the locking bolt 23. As shown in FIG. 5, the diameter of the transverse bore 32 is greater, preferably twice as great, as the diameter of the engaging second end 63 of the spring bracket 61.

The arrangement of the spring bracket 61 is such that the straight section 62, in the release position shown in FIG. 4, extends approximately parallel to the locking bolt 23 whereby the transitional portion 81 between of the straight portion 62 into the curved portion 61 may rest at the supporting housing wall 80 which is provided in the area of the edge of the window 30. Such a supporting action ensures that acceleration forces acting onto the locking bolt 23, when in its release position, are directed by the end 63 and the straight section 62 via the transitional portion 81 into the supporting housing wall 80 so that a secured and fixed position of the locking bolt 23 in its release position is provided. The straight section 62 is loaded substantially in its longitudinal direction in which the straight section is very stiff despite the elastic properties of the spring bracket material.

Figure 12:
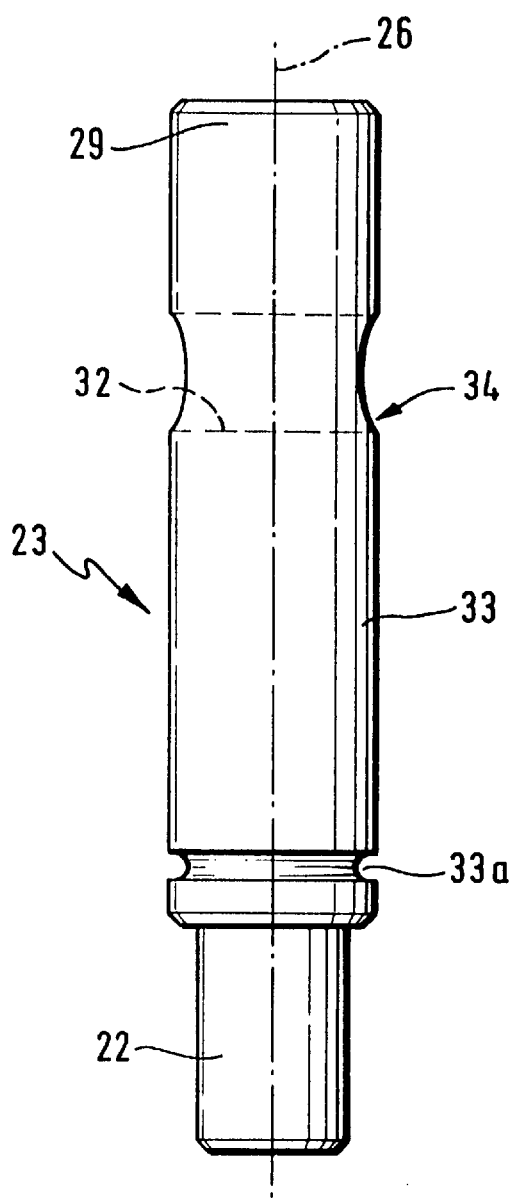
FIG. 12 is a side view of the locking bolt.

As shown in FIG. 12, the transverse bore 32 extends exactly at a right angle to the longitudinal axis 26 of the locking bolt 23. At the end of the base body 33 facing the locking section 22 a circumferential groove 33a for receiving a sealing ring, preferably an O-ring, is provided so that the introduction of dirt particles into the blind bore 28 is prevented.

Figure 13:
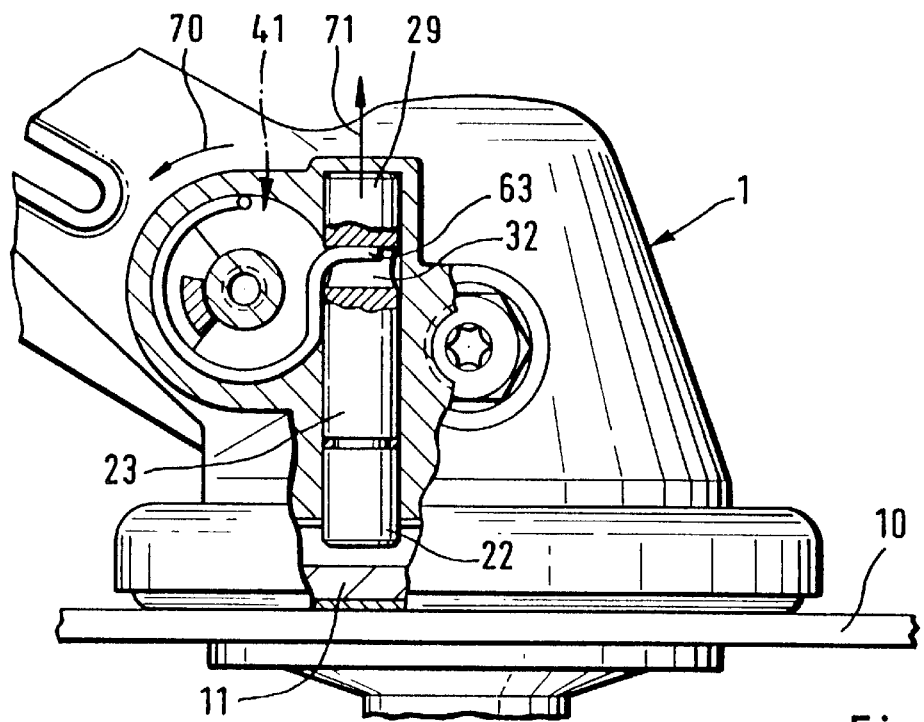
FIG. 13 is part-sectional view of the cutter head in a representation according to FIG. 4 with the locking bolt shown in the release position.

As shown in FIG. 13, the rotation of the turn knob 41 in the direction of arrow 70 lifts the locking bolt 23 in direction of arrow 71 until its end 29 abuts the bottom of the blind bore 28 that serves as an abutment. Upon further rotation of the turn knob 41, the spring bracket will widen. And, as shown in FIG. 4, the transitional portion 81 between the curved portion 61 and the straight portion 62 will contact the housing wall 80. The locking bolt 23 is thus secured in its release position. Due to the direct support of the transitional portion 81 at the housing wall 80, a fixation of the spring bracket at the housing and great loads can be supported thereat.

When it is desired to lock the drive shaft for exchanging the working tool member 10, the turn knob 41 is rotated in the direction of arrow 77 until it hits the stop so that the end 63 of the spring bracket 60 positioned in the transverse bore 32 of the locking bolt 23, is entrained in the rotational direction 77. Thus, the locking bolt 23 is displaced in the direction of arrow 78 toward the securing disc 11. In the representation according to FIG. 14 no catch opening 21 is positioned opposite the locking bolt 23 so that the locking bolt 23 will come to rest on the securing disc 11. Upon further rotation of the turn knob 41, the spring bracket 60 will deform. This deformation results in a reduced diameter of the curved portion 61. Thus, a spring force results which loads the locking bolt 23 in the direction of its locking position in the securing disc 11.

When the tool member 10 is now manually rotated to such an extent that the locking bolt 23 is aligned with a catch opening 21, the locking bolt 23 will be automatically moved into the catch opening 21 by the spring force of the spring bracket 60. The rotational position of the turn knob 41 is thus advantageously selected such that for the locking bolt 23 in the locking position a spring force remains that secures the locking bolt 23 in its locking position.

Figure 14:
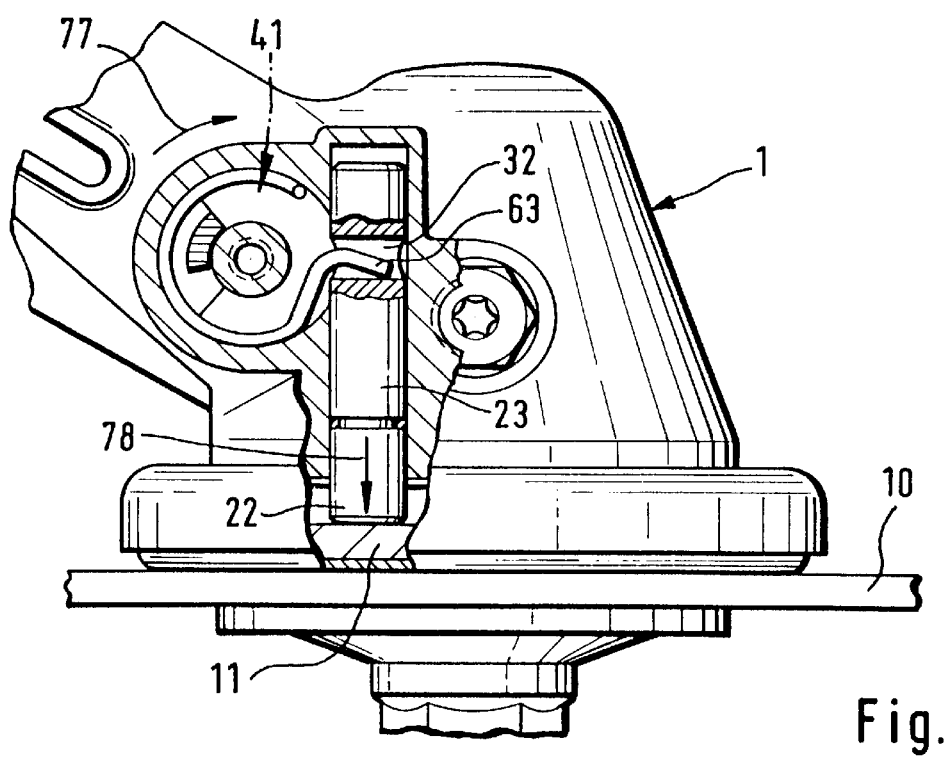
FIG. 14 is a representation according to FIG. 13 with a locking bolt in an intermediate position.
Figure 15:
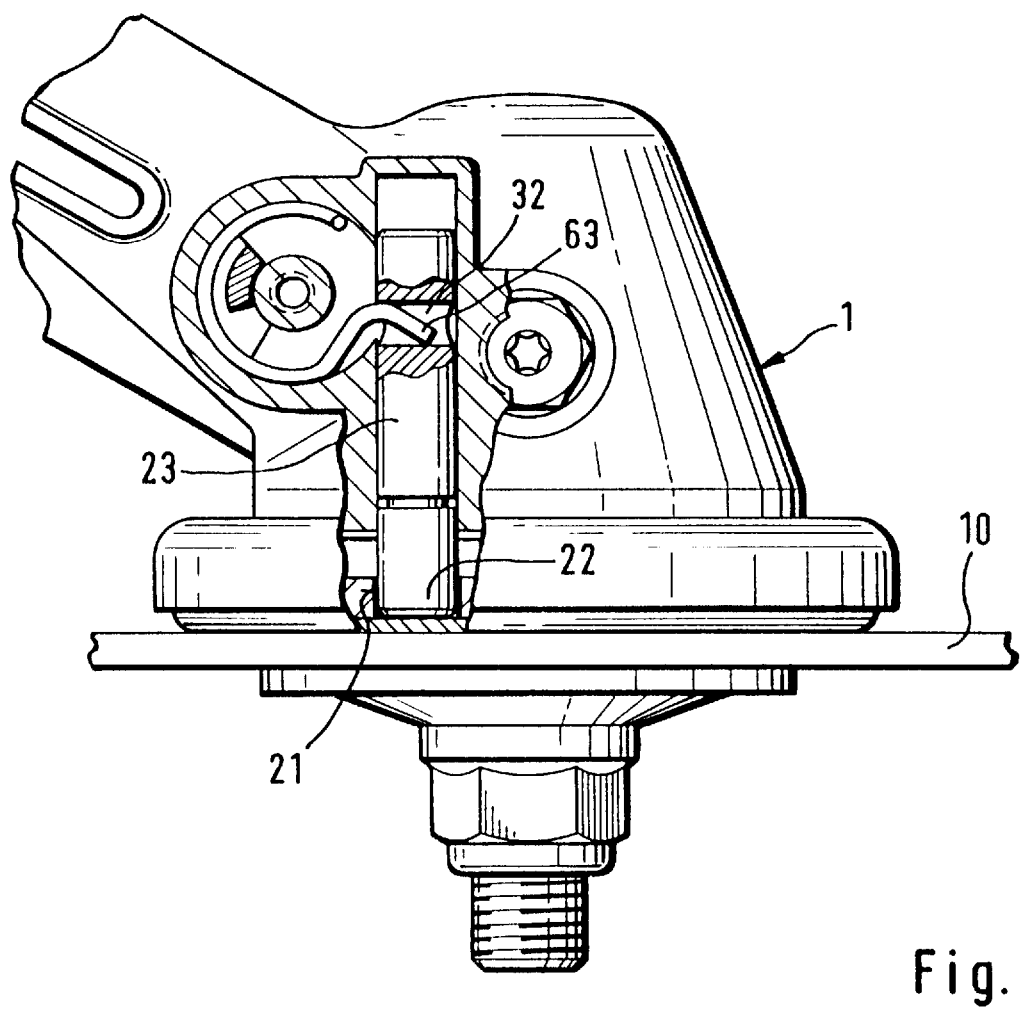
FIG. 15 is a representation according to FIG. 13 with the locking bolt shown in the locking position.

In order to be able to visually detect the rotational position of the turn knob 41, the head 42 has a cap 90 with a marking 91. Independent of the rotational position of the securing disc 11, the operator can turn the turn knob 41 into the end positions in which the locking bolt 23 is in the release position (FIGS. 1, 13) or in which the locking bolt 23 is in the locking position (FIG. 15). Due to the frictional connection of the turn knob 41 at the housing 2, the spring force of the spring bracket 60 resulting when the securing disc 11 is in a rotational position as shown in FIG. 14 is securely supported.

The present invention is, of course, in no way restricted to the specific disclosure of the specification and drawings, but also encompasses any modifications within the scope of the appended claims.

What I claim is:

1. A locking device for a working tool, said locking device comprising:

a securing element fixedly connected to a drive shaft of a rotating tool member;

a locking bolt having a longitudinal axis and axially moveable between a locking position and a release position;

said securing element having at least one catch opening for receiving said locking bolt in said locking position;

an actuating element, positioned adjacent to said locking bolt;

a spring element having a first end and a second end;

said first end engaging said actuating element;

said second end projecting into a travel path of said locking bolt and engaging said locking bolt for moving said locking bolt into said locking position or into said release position when said actuating element is operated.

2. A locking device according to claim 1, wherein said locking bolt has a receiving element and wherein said second end engages said receiving element.

3. A locking device according to claim 2, wherein said receiving element is a transverse bore extending perpendicularly to said longitudinal axis of said locking bolt.

4. A locking device according to claim 3, wherein said transverse bore has a diameter that is greater than a diameter of said second end.

5. A locking device according to claim 4, wherein said diameter of said transverse bore is at least twice as big as said diameter of said second end.

6. A locking device according to claim 1, wherein said spring element is a C-shaped spring bracket.

7. A locking device according to claim 6, wherein said spring bracket comprises a curved portion extending in a plane.

8. A locking device according to claim 7, wherein said curved portion extends over an angular distance of 180° to 270°.

9. A locking device according to claim 8, wherein said angular distance is 220°.

10. A locking device according to claim 7, wherein said second end is positioned in said plane.

11. A locking device according to claim 7, wherein said first end extends perpendicularly to said plane.

12. A locking device according to claim 7, wherein said second end extends parallel to a diametric line extending through a center of said curved portion.

13. A locking device according to claim 7, wherein said spring bracket cooperates radially with a stop member provided at a housing.

14. A locking device according to claim 13, wherein said spring bracket comprises a straight portion and wherein said second end is located at said straight portion.

15. A locking device according to claim 14, wherein said straight portion and said second end extend perpendicularly to one another.

16. A locking device according to claim 14, wherein:

said spring bracket has a transitional portion connecting said straight portion to said curved portion;

said transitional portion is supported at said stop member; and said stop member is a supporting housing wall of the housing positioned radially outwardly relative to said spring bracket.

17. A locking device according to claim 6, wherein said spring bracket is received in an annular receiving chamber of a housing.

18. A locking device according to claim 6, wherein said actuating element is a turn knob and wherein said spring bracket surrounds a rotational axis of said turn knob.

19. A locking device according to claim 18, wherein said turn knob has a guide section and wherein said spring bracket surrounds said guide section.

* * * * *